Patented Jan. 17, 1933

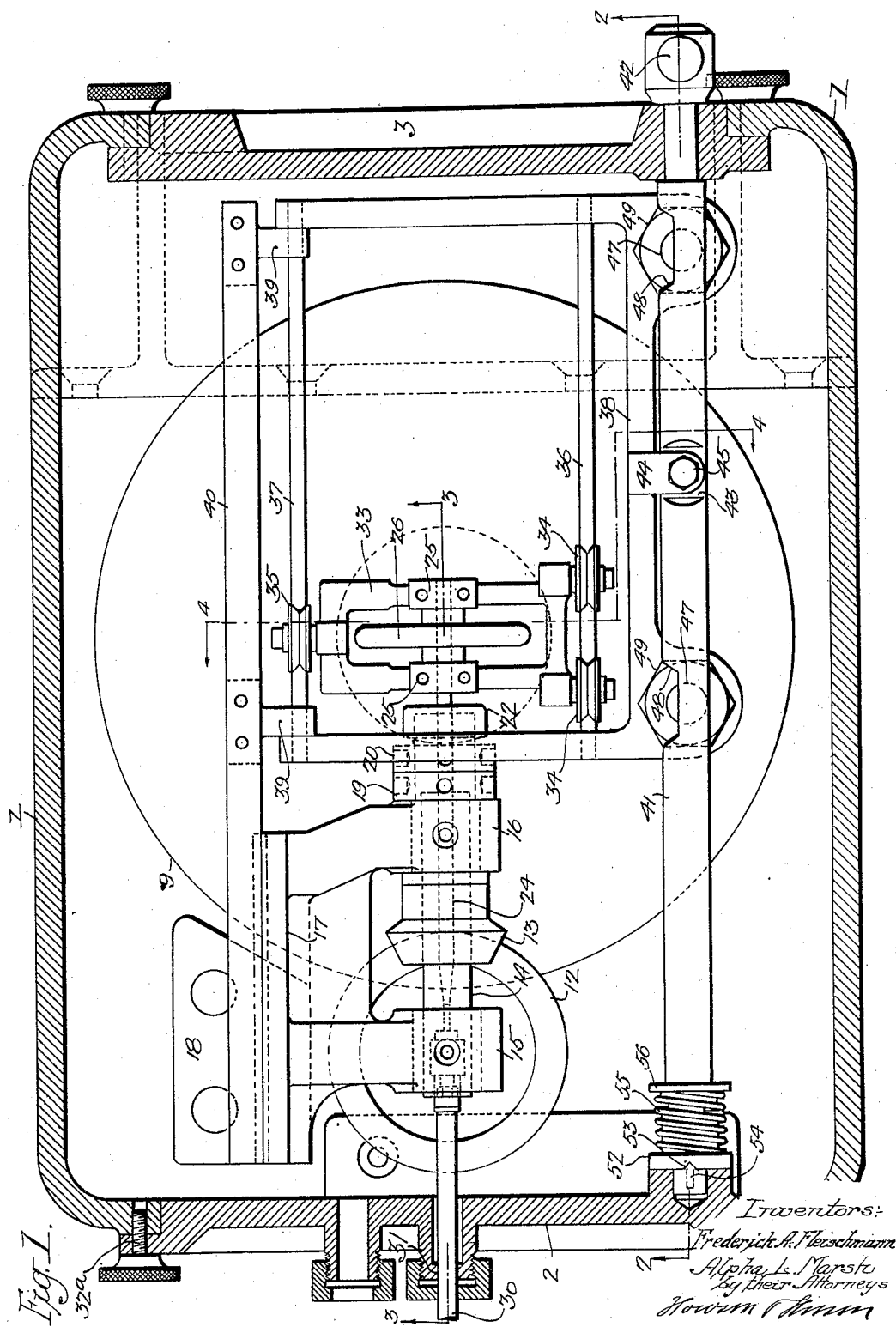

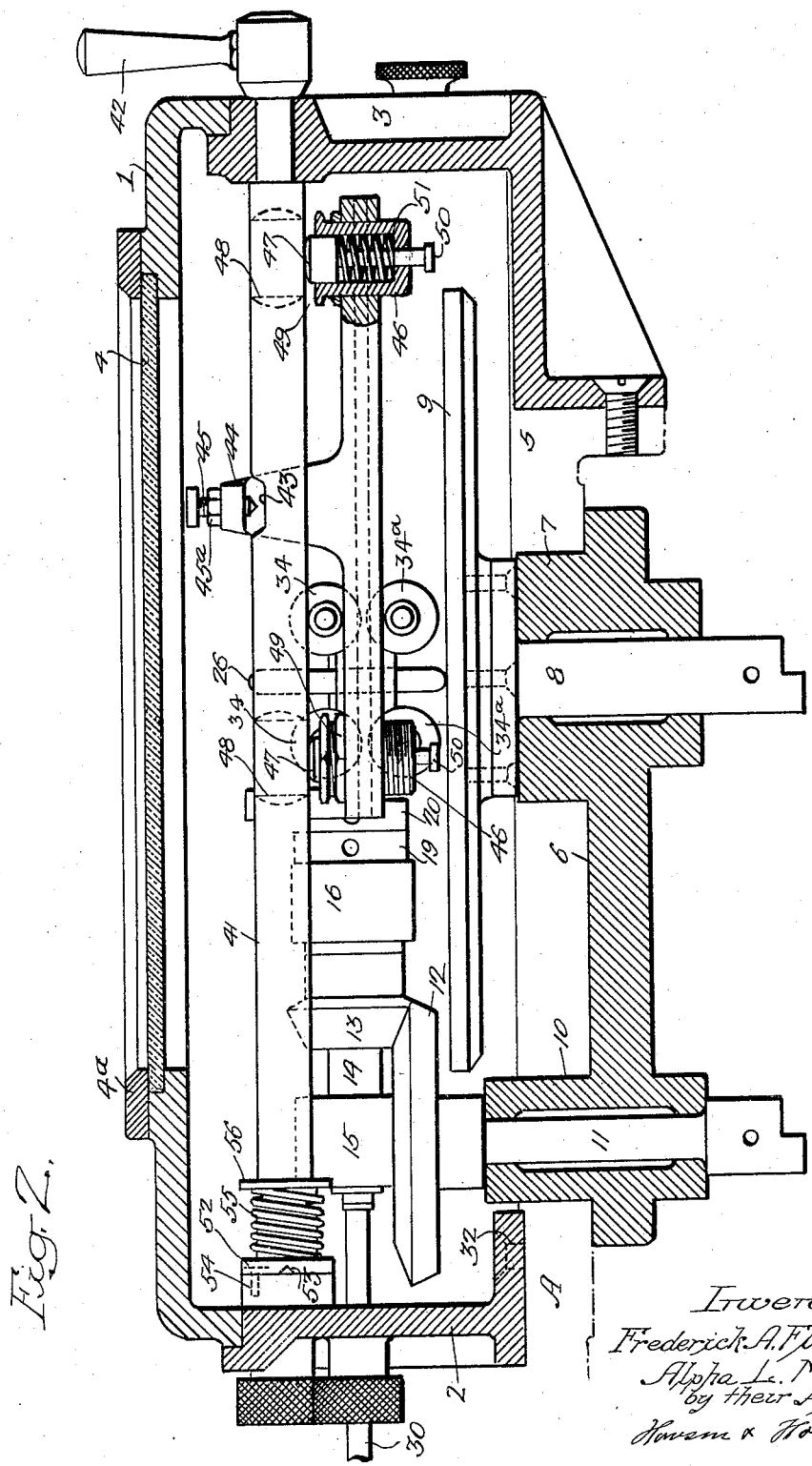

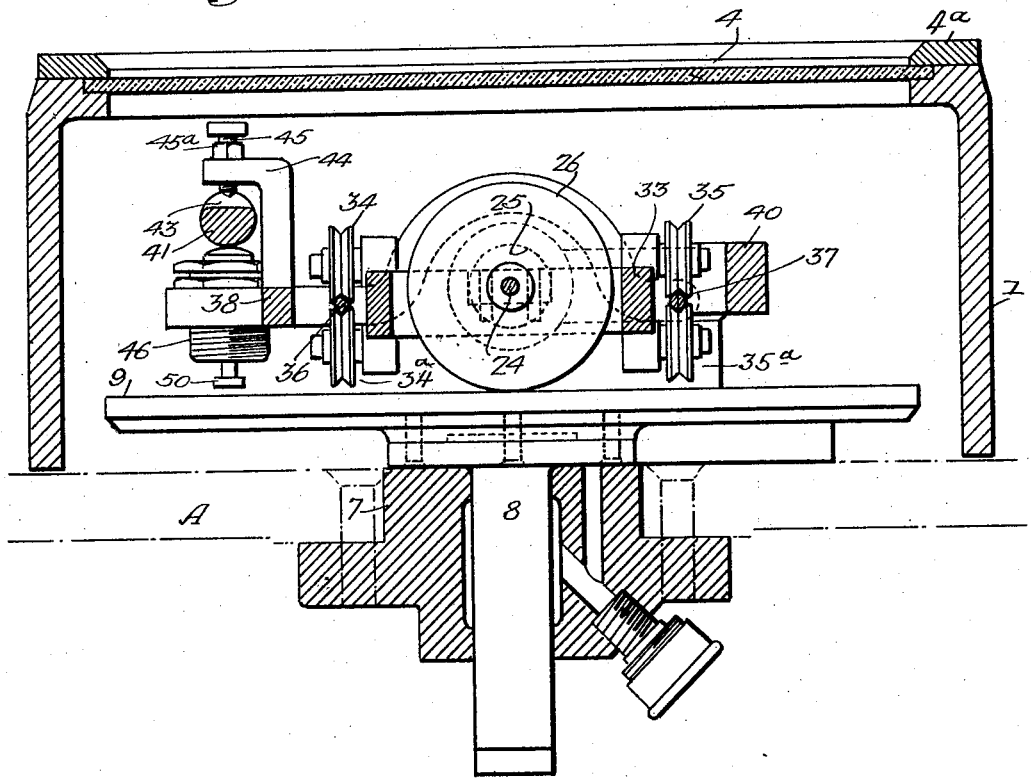
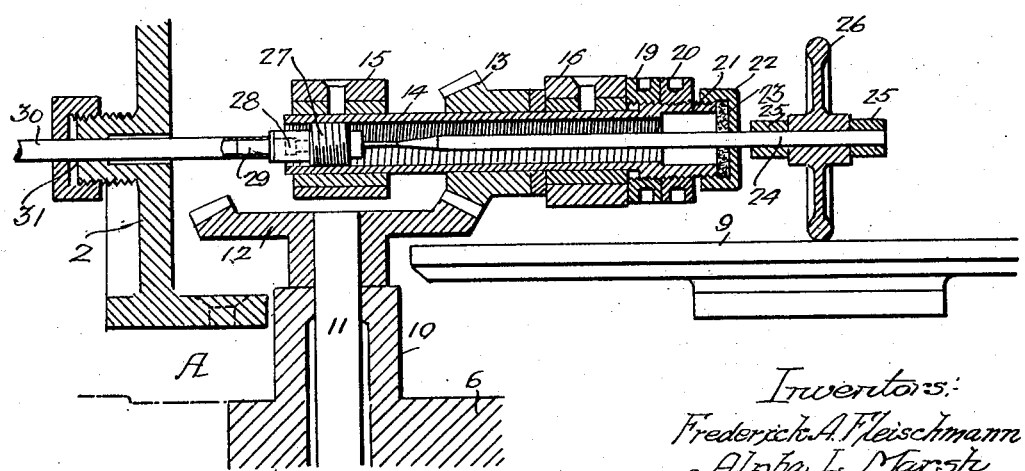

1,894,308

UNITED STATES PATENT OFFICE

FREDERICK A. FLEISCHMANN, OF DREXEL HILL, AND ALPHA L. MARSH, OF PHILADELPHIA, PENNSYLVANIA

SPEEDOMETER

Application filed October 4, 1930. Serial No. 486,480.

This invention relates to certain improvements in speedometers for dynamometer cars. Certain details of construction have been omitted, which do not relate to this particular mechanism, in order to avoid confusion.

One object of the invention is to construct the carriage which supports the tube shaft wheel, so that it will have a three-point suspension at the varying points of travel.

A further object of the invention is to improve the construction of the pick-up frame operating shaft, so that the frame can be held in such positions as to insure the application to, or removal from, the constant speed disk of the tube shaft wheel, as desired.

A still further object of the invention is to improve the speedometer shaft tube by omitting sufficient screw-threads to prevent lateral movement of the wheel shaft when the carriage has reached its limit of travel on the speedometer disk.

The invention relates to other details which will be described hereinafter.

In the accompanying drawings:

Fig. 1 is a plan view of sufficient of the speedometer assembly to illustrate our invention;

Fig. 2 is a longitudinal sectional view on the line 2—2, Fig. 1;

Fig. 3 is a longitudinal sectional view on the line 3—3, Fig. 1; and

Fig. 4 is a transverse sectional view on the line 4—4, Fig. 1.

1 is a casing open at the bottom and having inturned flanges, in this instance, which are preferably secured to a base A. The casing has detachable side plates 2 and 3, and in the top of the casing is an opening for observation of the speedometer contained therein. In the opening is a sheet of glass 4 held in place by a suitable ring 4a. Projecting into the open bottom of the casing 1 is a bearing plate 6 mounted on the underside of the base A and having one bearing 7 for the speedometer disk spindle 8, having at the upper end a speedometer disk 9. This bearing plate 6 has another bearing 10 for the car speed drive shaft 11, at the upper end of which is a bevel gear wheel 12, which is located within the casing 1, and this bevel gear wheel meshes with a bevel pinion 13 on a tubular shaft 14. The tubular shaft is mounted in two bearings 15 and 16, which project from a base 17. This base has a flange 18, which is securely bolted to the base A within the casing 1. Beyond the bearing 16 are two lock-nuts 19 and 20, which are mounted on the threaded portion 21 of the tubular shaft 14, and on the end of this shaft is a dust cap 22, provided with a felt washer 23. 24 is a speedometer wheel shaft, which extends through the tubular shaft 14, and is mounted in bearings 25 on a carriage 33 at its inner end. These bearings are spaced apart, and mounted on the shaft is a speedometer wheel 26. This wheel is preferably hardened and has a rounded periphery, which travels on the speedometer disk 9, and is driven by said disk, as it will be understood that the speed of the disk is constant.

The tubular shaft 14 has an internal screw-thread throughout its entire length, with the exception of a portion at the inner end, where the opening is enlarged. It will be noticed that a portion of the speedometer wheel shaft 24 is reduced in diameter to provide flexibility when the wheel and carriage are raised from the disk, and when the speedometer is not in use. The outer end of the shaft is enlarged as at 27, and this enlarged portion is threaded and meshes with the internal screw-threads of the tubular shaft 14. The portion 27 may be made separate from the shaft and secured thereto as shown, or may form an integral part of the shaft.

On the end of the speedometer wheel shaft 24 is a head 28, and coupled to this head is a pen rod connection 29, to which the pen rod 30 is secured. This pen rod extends through an opening 31 in the end cover 2 of the casing 1. This end cover is secured in position by screws 32 and 32a, Figs. 1 and 2. As mentioned above, the opening in the inner end of the tubular shaft 14 is much larger than the portion having internal threads, and the depth of this opening is slightly more than the length of the enlarged threaded portion 27 of the speedometer wheel shaft 24, so that when the wheel nears the periphery of the speedometer disk, the threaded portion of the wheel shaft enters this enlarged portion of the tubular shaft 14, and further lateral movement of the speedometer wheel is prevented, as the enlarged portion 27 of the said shaft has passed the inner end of the internal screw-threads of the tubular shaft 14.

The bearings 25 for the wheel shaft 24 are mounted on a carriage 33. On one end of the carriage are two pairs of grooved wheels 34—34a, spaced apart, and at the opposite end of the carriage is a single pair of wheels 35—35a on a line with the center line of the speedometer wheel 26. The two pairs of wheels 34—34a travel on the rail 36 and the single pair of wheels 35—35a travel on the rail 37 mounted in the pick-up frame 38. The rail 37 also acts as a pivot for the frame and is mounted in bearings 39 on a bar 40, firmly bolted to the base 17, which carries the bearings 15 and 16. The rails are circular in cross-section and the groove in each wheel is V-shaped.

In order to raise the pick-up frame so that the speedometer wheel will be clear of the speedometer disk, we provide an operating shaft 41, adapted to bearings in the end cover plates 2 and 3 of the casing 1, and this operating shaft has a handle 42, outside of the casing. The shaft 41 is notched at 43, and a bracket 44 projecting upwards from the pick-up frame 38 extends over the shaft 41 at the notch 43, and has a set-screw 45 with which the shaft comes in contact when it is turned, so as to elevate the frame 38 a sufficient distance for the wheel 26 to clear the speedometer disk 9. On the set-screw 45 is a lock-nut 45a, which can be turned so as to lock the set-screw in the position to which it is adjusted.

In the speedometer pick-up frame are two cups 46, in which are spring plungers 47, which bear against the underside of the operating shaft 41, and the shaft 41 has notches 48 in line with the plungers, so that the wheel 26 is held yieldingly against the speedometer disk. The periphery of each cup is threaded and they are adapted to threaded openings in the frame, and on the threaded portion of each cup is a jamb nut 49, which locks the cup to the frame after adjustment. The spring plunger extends through the cap and has a head 50 which limits the upward movement of the plunger. The spring 51 rests against the base of the cup and bears against the enlarged portion of the plunger. At one end of the operating shaft 41 is a latch collar 52, which is notched at 53 so as to engage a pin 54 on the bearing of the shaft, and a coil-spring 55 between this latch collar and a fixed collar 56 on the shaft tends to yieldingly press the latch collar against the bearing. This latch collar maintains the shaft 41 in either of its two positions.

We claim:

1. The combination in a speedometer, of a driven speedometer disk; a speedometer wheel arranged to bear against the disk; a shaft on which the wheel is mounted; a carriage; bearings on the carriage for said speedometer wheel shaft; a pick up frame; longitudinal rails on the frame; two pairs of wheels on one end of the carriage arranged to travel on one rail; and a single pair of wheels on the opposite end arranged to bear upon the other rail so that said carriage has a three point suspension.

2. The combination in a speedometer, of a disk; a wheel bearing against the face of the disk; a shaft on which the wheel is mounted; a carriage having bearings for the said shaft; a pivoted pick up frame having rails; wheels on the carriage engaging with the rails; cups adjustably mounted on the frame; a spring pressed plunger within each cup; a longitudinal operating shaft against which the plungers bear, the pick up frame having a portion extending over the longitudinal operating shaft, said shaft having a notch in line with the overhanging portion so that on turning the shaft the frame can be raised to elevate the first named wheel clear of the disk.

3. The combination in a speedometer, of a driven speedometer disk; a speedometer wheel arranged to bear against the disk; a shaft on which the wheel is mounted; a carriage for the said speedometer wheel shaft; a pick up frame; longitudinal rails on the pick up frame on which the carriage travels, said carriage having two upper wheels at one end and a single upper wheel on the opposite end arranged to travel on the upper portions of the rails; two lower wheels directly under the upper wheels; and a single lower wheel directly under the single upper wheel, the lower wheel bearing against the under side of the rails.

FREDERICK A. FLEISCHMANN.
ALPHA L. MARSH.